United States Patent
Liu

(10) Patent No.: US 11,773,890 B2
(45) Date of Patent: Oct. 3, 2023

(54) QUICK CONNECTOR WITH COMPRESSIVE AND ROTATIONAL LOCKING AND UNLOCKING MECHANISM

(71) Applicant: Da-Ming Liu, New Taipei (TW)

(72) Inventor: Da-Ming Liu, New Taipei (TW)

( * ) Notice: Subject to any disclaimer, the term of this patent is extended or adjusted under 35 U.S.C. 154(b) by 886 days.

(21) Appl. No.: 16/747,094

(22) Filed: Jan. 20, 2020

(65) Prior Publication Data
US 2021/0164510 A1 Jun. 3, 2021

(30) Foreign Application Priority Data
Nov. 28, 2019 (TW) .................................. 108143422

(51) Int. Cl.
*F16B 21/04* (2006.01)
*F16B 21/07* (2006.01)
*H01R 13/625* (2006.01)

(52) U.S. Cl.
CPC ............ *F16B 21/04* (2013.01); *F16B 21/071* (2013.01); *F16B 21/078* (2013.01); *H01R 13/625* (2013.01)

(58) Field of Classification Search
CPC .......... F16B 21/04; F16B 7/20; F16B 21/071; F16B 21/078; A61B 5/150603; A61B 2050/0063; A61B 1/00121; A61B 1/00112; A61B 1/00126; Y10T 403/7007; H01R 13/625; H01R 33/9456; H01R 33/9655; H01R 33/973; H01R 33/9756
USPC ......................................................... 403/349
See application file for complete search history.

(56) References Cited

U.S. PATENT DOCUMENTS

| 4,537,453 | A | | 8/1985 | Takeuchi | |
|---|---|---|---|---|---|
| 4,869,237 | A | | 9/1989 | Eino et al. | |
| 5,029,973 | A | * | 7/1991 | Rink | H01R 13/625 |
| | | | | | 439/577 |
| 9,437,961 | B1 | * | 9/2016 | Smajda | H01R 13/28 |
| 9,548,558 | B1 | * | 1/2017 | Hsu | H01R 13/635 |
| 2006/0046566 | A1 | * | 3/2006 | Zemba | H01R 13/625 |
| | | | | | 439/578 |
| 2011/0225789 | A1 | * | 9/2011 | Darnell | F16L 37/113 |
| | | | | | 29/428 |

(Continued)

FOREIGN PATENT DOCUMENTS

| CN | 201038441 Y | 3/2008 |
|---|---|---|
| CN | 101301189 A | 11/2008 |

(Continued)

*Primary Examiner* — Josh Skroupa
(74) *Attorney, Agent, or Firm* — CIPO IP Group

(57) ABSTRACT

A quick connector with a compressive and rotational locking and unlocking mechanism includes a socket, a plug, a rotatable collar and an undulant resilient piece. The socket includes a first connector body and a plug-connection trackway extending obliquely and having an engaging notch at a terminal end thereof. The plug includes a second connector body and a first limiting wall protruding from the plug. The rotatable collar can be assembled on the plug and includes an engaging protrusion and a second limiting wall. When the rotatable collar is rotated, the engaging protrusion enters into the plug-connection trackway and moves to the terminal end of the plug-connection trackway, and the undulant resilient piece abuts against and forces the first and second limiting walls away from each other, such that the engaging protrusion is lodged in the engaging notch to form a locked state.

20 Claims, 9 Drawing Sheets

(56) References Cited

U.S. PATENT DOCUMENTS

| | | | | |
|---|---|---|---|---|
| 2013/0035550 A1* | 2/2013 | Watanabe | ......... | H01R 13/6276 |
| | | | | 600/132 |
| 2014/0106617 A1* | 4/2014 | Csak | ................. | H01R 13/5845 |
| | | | | 439/606 |
| 2014/0235073 A1* | 8/2014 | Scorzelli | .............. | H01R 13/625 |
| | | | | 439/13 |
| 2015/0162702 A1* | 6/2015 | Opgenorth | .......... | H01R 13/623 |
| | | | | 439/312 |
| 2018/0183159 A1* | 6/2018 | Cook | .................. | H01R 13/622 |
| 2020/0099167 A1* | 3/2020 | Vanzo | ................. | H01R 13/633 |

FOREIGN PATENT DOCUMENTS

| | | | | |
|---|---|---|---|---|
| CN | 208240976 U | 12/2018 | | |
| CN | 109716595 A | 5/2019 | | |
| DE | 102018107893 A1 * | 10/2019 | ........... | H01R 13/508 |

* cited by examiner

QUICK CONNECTOR WITH COMPRESSIVE AND ROTATIONAL LOCKING AND UNLOCKING MECHANISM

CROSS-REFERENCE TO RELATED PATENT APPLICATION

This non-provisional application claims priority to and the benefit of, under U.S.C. § 119(a), Taiwan Patent Application No. 108143422, filed in Taiwan on Nov. 28, 2019. The entire content of the above identified application is incorporated herein by reference.

FIELD

The present disclosure relates to a quick connector, and more particularly to a quick connector which is applicable to a medical device and allows a socket of the quick connector to move toward a plug of the quick connector through rotation of a rotatable collar arranged on the plug.

BACKGROUND

Electronic devices (e.g., smart phones, tablet computers, desktop computers, laptop computers, digital cameras, etc.) are usually configured with at least one connector for receiving externally-transmitted signals and power. Generally, a connector refers to any connecting component and its sub-components that are used for transmission of signals and power, and serves as a bridge for all types of signals. The quality of the connector affects the reliability of the transmission and is closely associated with the operation of the electronic devices. By virtue of the connector, multiple electronic devices can be connected together as integral parts of a more complete system, such that signals can be mutually transmitted among the electronic devices. Therefore, the connector is a vital component that enables the electronic devices to perform their respective functions.

As the purposes and install locations of connectors differ, in order to adapt to and fulfill different practical requirements, the connectors have been developed with varying structures. Taking a medical device, such as an endoscope, for example, since a frontal end thereof would enter into a patient's body in practical implementation, in the interest of hygiene, the endoscope is often designed with a two-part configuration so as to allow for replacement of a front part thereof by a medical professional. However, the front and rear parts of such medical devices are usually assembled with or disassembled from each other via threaded engagement or compressive engagement. The threaded engagement requires the medical professional to twist the front or rear part for many times in one direction before the two parts can be secured together, and then twist the same for more times in a reverse direction to disengage the two parts from each other. As for the compressive engagement, the medical professional will need to exert great effort in pressing the front and rear parts together before the two parts can be secured together, and then exert an equal amount of effort to disengage the two parts from each other. Therefore, both manners of engagement or disengagement necessitate a significant amount of time and effort in order to firmly twist or press the two parts together, or separate the two parts from each other, which can cause inconveniences for the medical professional assigned to this task.

To address the above-mentioned issue that is still at large in the relevant industry, and after a myriad of designs, modifications, and scientific inquiries, the present disclosure aims to provide a connector that facilitates faster engagement or disengagement, and ensure a stable connection once the two parts have been engaged together.

SUMMARY

In response to the above-referenced technical inadequacies, the present disclosure provides a quick connector with a compressive and rotational locking and unlocking mechanism.

In one aspect, the present disclosure provides a quick connector with a compressive and rotational locking and unlocking mechanism. The quick connector is applicable to a medical device and includes a cylindrical socket, a cylindrical plug, a rotatable collar and an undulant resilient piece. The cylindrical socket has a first connector body disposed therein. At least one plug-connection trackway is formed on a peripheral surface of a rear segment of the cylindrical socket along a circumferential direction. The plug-connection trackway extends obliquely in a direction toward a front segment of the cylindrical socket, and has an engaging notch at a terminal end of the plug-connection trackway. The engaging notch extends in a direction toward the rear segment of the cylindrical socket. The cylindrical plug has a second connector body disposed therein and a first limiting wall protruding from an outer peripheral surface of the cylindrical plug. The rotatable collar can be movably assembled on the cylindrical plug, and has a through hole, at least one engaging protrusion and a second limiting wall. The through hole is formed at a center of the rotatable collar. The at least one engaging protrusion is protrudingly arranged on an inner peripheral surface of a front segment of the rotatable collar along the circumferential direction. The second limiting wall protrudes from an inner peripheral surface of a rear segment of the rotatable collar. When the rotatable collar is assembled to the cylindrical plug, the second limiting wall corresponds to the first limiting wall, and is located at a position rearward of the first limiting wall. The undulant resilient piece is capable of being located between the first limiting wall and the second limiting wall, and abutting against each of the first limiting wall and the second limiting wall. When the rear segment of the cylindrical socket enters into the through hole, front segments of the first connector body and the second connector body engage with each other so that the first connector body and the second connector body form a first combined state, and the at least one engaging protrusion enters into the corresponding plug-connection trackway and, with the rotation of the rotatable collar, moves along the plug-connection trackway until reaching the terminal end of the plug-connection trackway to force the cylindrical socket to move in a direction toward the cylindrical plug to form a second combined state of the first connector body and the second connector body, the second combined state being the front segments of the first connector body and the second connector body being engaged with each other with a degree of tightness larger than that of the first combined state to establish an electrical connection therebetween. When the rotatable collar is no longer driven to rotate, a force acting from the undulant resilient piece urges the first limiting wall and the second limiting wall to move away from each other so that the at least one engaging protrusion is lodged in position in the engaging notch, and an inner sidewall of the engaging notch compresses against an outer peripheral surface of the at least one engaging protrusion to form a locked state.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
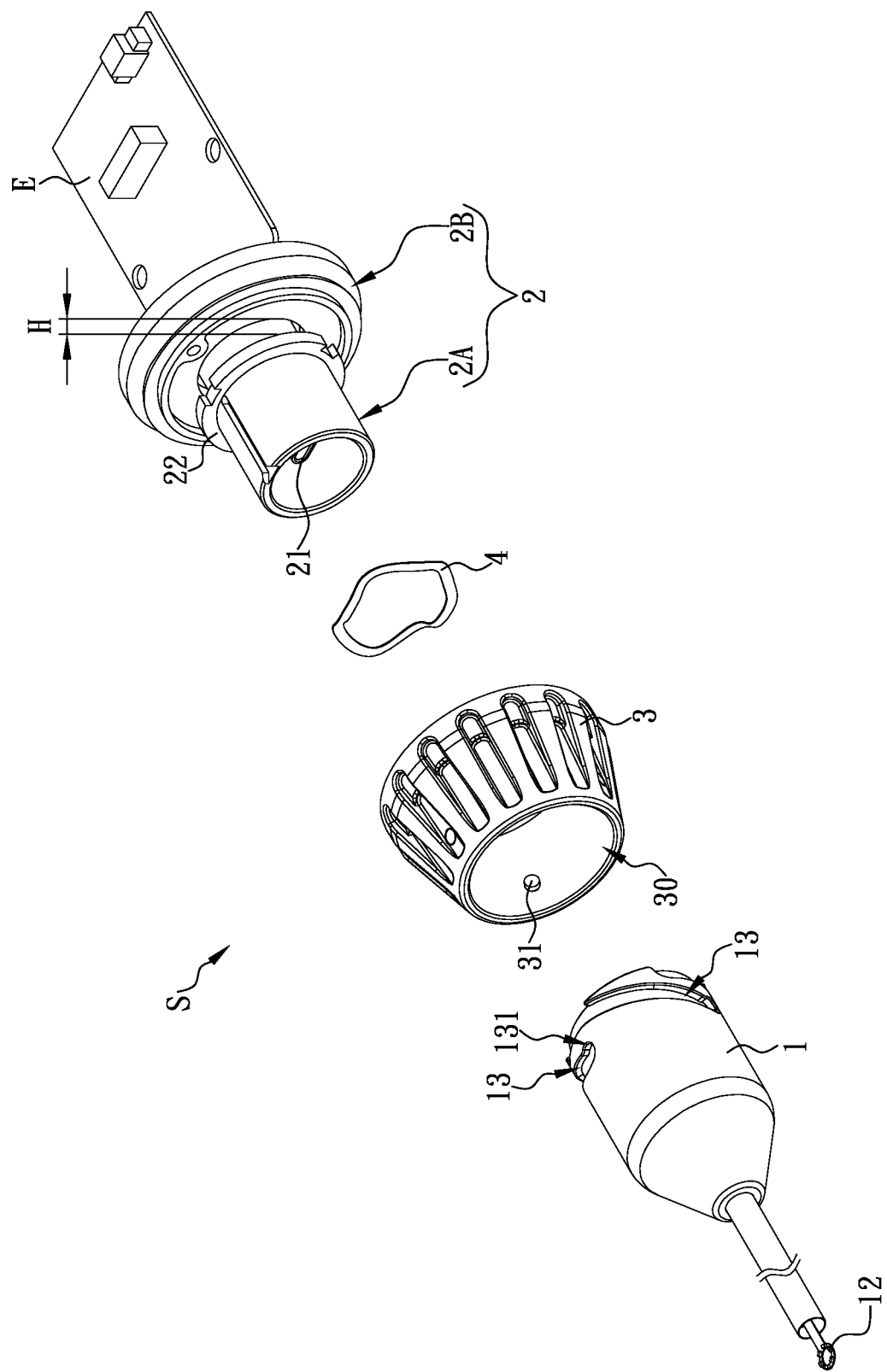
FIG. 1 is a schematic exploded front view showing a quick connector according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a quick connector with a compressive and rotational locking and unlocking mechanism. In certain embodiments, the quick connector S is applicable to a medical device, allows for quick assembly of an examining unit (e.g., an endoscopic imaging unit) thereon, and after use, allows for quick removal and replacement of the examining unit. Referring to FIG. 1, the quick connector S includes a socket 1, a plug 2, a rotatable collar 3, and an undulant resilient piece 4. For ease of illustration, "front" positions or segments of the foregoing components are defined as those relatively closer to a lower-left corner in FIG. 1, while "rear" positions or segments of the foregoing components are defined as those relatively closer to an upper-right corner in FIG. 1. Furthermore, the quick connector S can be in multiple configurations and is not limited to that shown in FIG. 1, and any modifications made to any component thereof should fall within the scope of the present disclosure, as long as the basic structure and effect remain similar to those of the quick connector S disclosed in the following embodiments.

Figure 2:
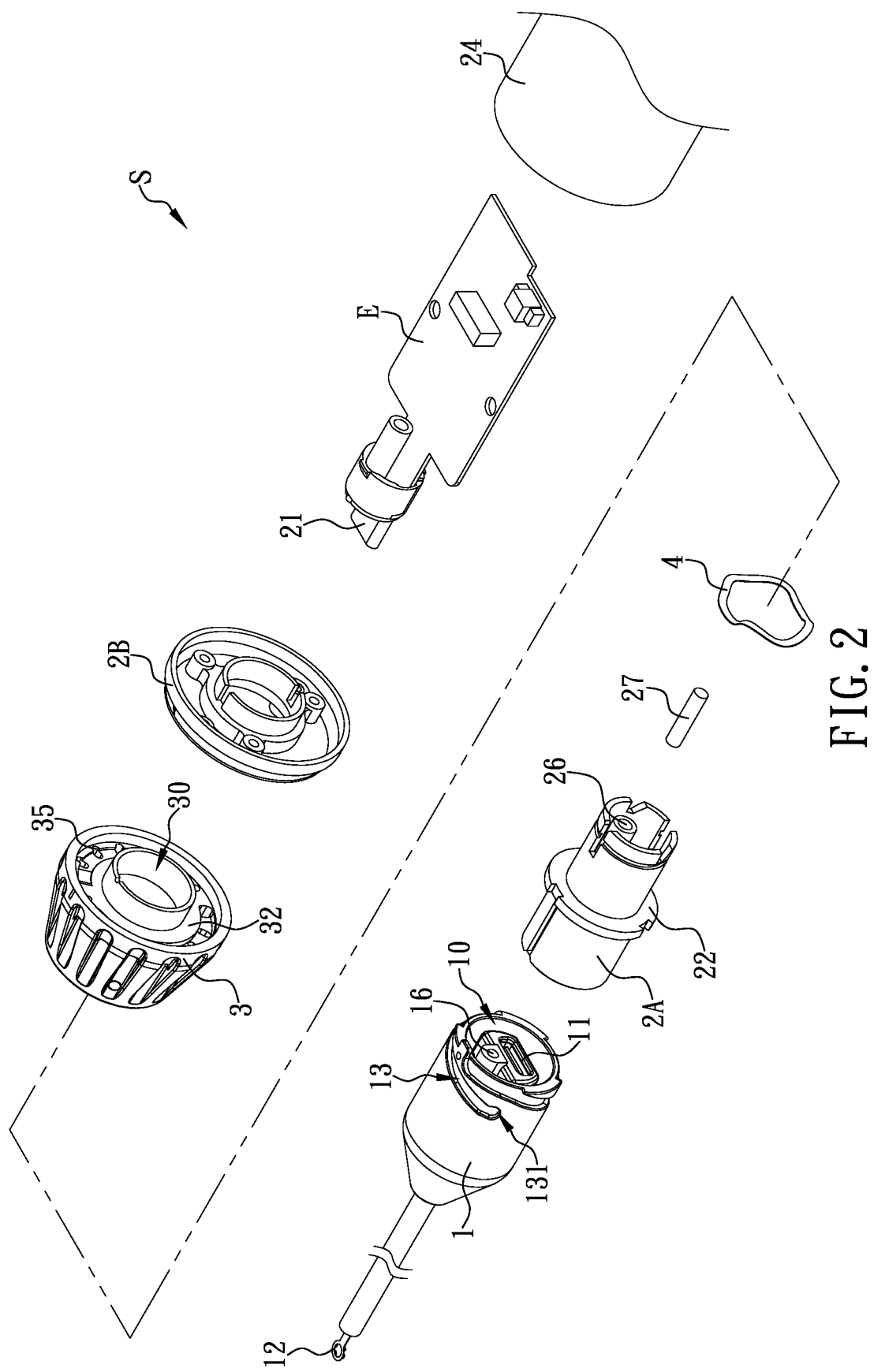
FIG. 2 is a schematic exploded rear view showing the quick connector according to the present disclosure.

Referring to FIGS. 1 and 2, the socket 1 is cylindrical in shape, and has a socket space 10 formed inward at a rear side thereof. A first connector body 11 (e.g., a Type-C connector, an HDMI connector, etc.) is disposed within the socket space 10, and a connection port of the first connector body 11 is exposed from the socket space 10. In certain embodiments, an image-capturing unit 12 can be disposed at a front segment of the socket 1, and the image-capturing unit 12 can be electrically connected to the first connector body 11 (such as through a flexible circuit board). Furthermore, at least three plug-connection trackways 13 are formed on a peripheral surface of a rear segment of the socket 1 along a circumferential direction, and the at least three plug-connection trackways 13 are equidistantly spaced apart from each other. Each of the plug-connection trackways 13 extends obliquely in a direction toward the front segment of the socket 1, and has an engaging notch 131 at a terminal end thereof. The engaging notch 131 extends in a direction toward the rear segment of the socket 1. That is, a terminal end region of each of the plug-connection trackways 13 that includes the engaging notch 131 forms the shape of an inverted "V." However, in other embodiments according to the present disclosure, various adjustments can be made to the plug-connection trackways according to practical requirements, such as adjusting the quantity thereof to be at least one, or adjusting the spacing between each of the plug-connection trackways. In addition, the image-capturing unit 12 at the front segment of the socket 1 can also be replaced with other elements and is not limited thereto.

Referring again to FIGS. 1 and 2, the plug 2 is cylindrical in shape, and includes a second connector body 21 (e.g., a Type-C connector, an HDMI connector, etc.) that is disposed therein, and a first limiting wall 22 that protrudes from an outer peripheral surface of the plug 2. In certain embodiments, a circuit board E is disposed at a rear segment of the plug 2, and the circuit board E is electrically connected to the second connector body 21. Furthermore, referring to FIG. 3, the plug 2 further includes a plug body 2A and a limiting ring 2B. The plug body 2A is in the shape of a hollow cylinder to accommodate the second connector body 21 within, and the first limiting wall 22 is formed on an outer peripheral surface of the plug body 2A. The shape of a front segment of the plug body 2A matches that of the socket space 10 of the socket 1, so as to allow for the plug body 2A to enter into the socket space 10, such that the second connector body 21 and the first connector body 11 can be pluggingly connected to each other to establish electrical connection therebetween. In addition, a rear segment of the plug body 2A can be fixed against the limiting ring 2B; a rear segment of the limiting ring 2B can be fixed against a housing 24; and the circuit board E can be nestled within the housing 24.

Figure 3:
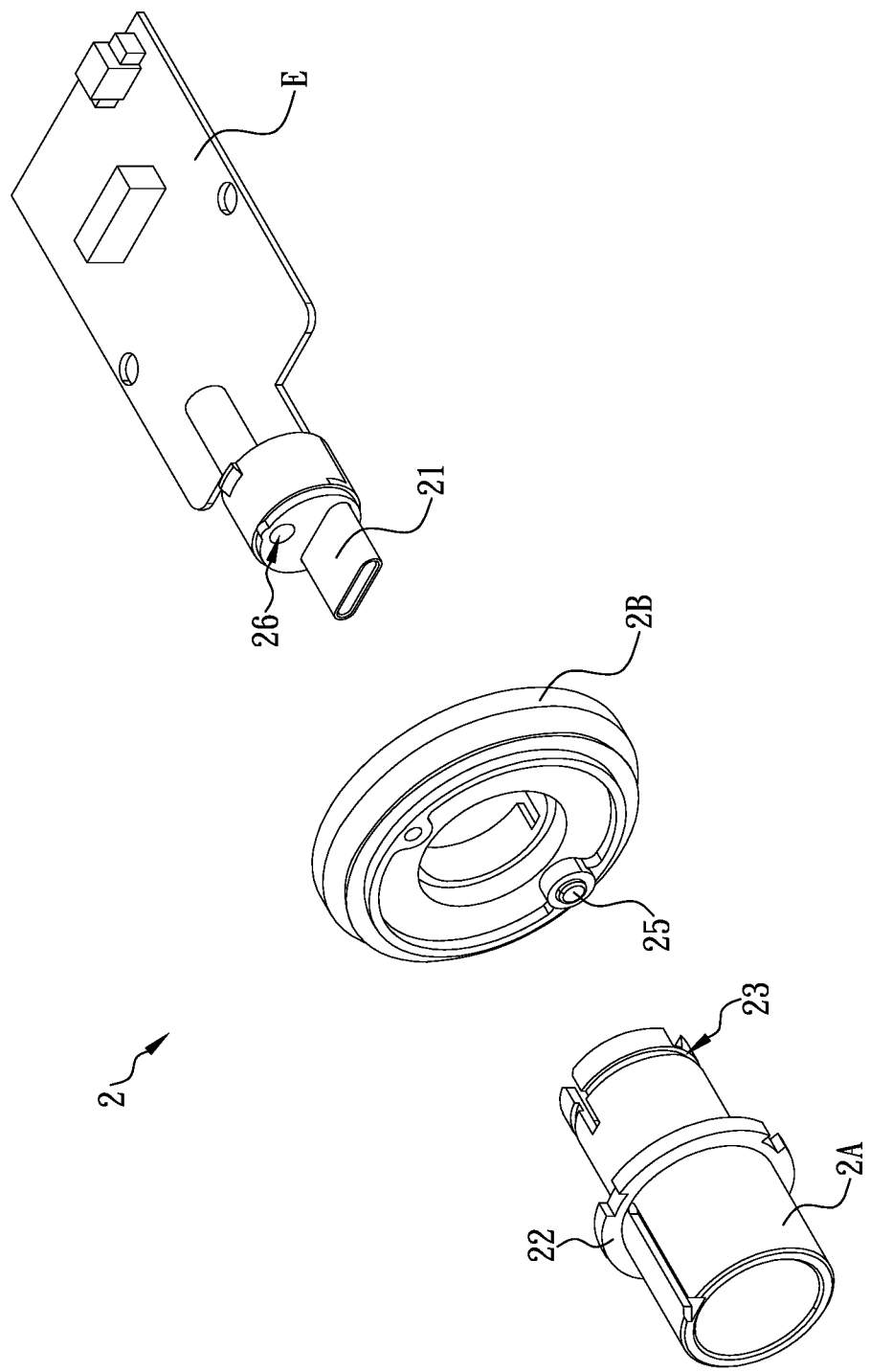
FIG. 3 is a schematic exploded perspective view showing a plug of the quick connector according to the present disclosure.

Referring to FIGS. 1 to 3, in certain embodiments, the rear segment of the plug body 2A can pass through a central aperture of the limiting ring 2B so as to protrude from a rear side of the limiting ring 2B with the first limiting wall 22 being spaced apart from the limiting ring 2B by a distance H. In addition, a C-shaped brace (not shown in the figures) can be clamped to the rear segment of the plug body 2A (such as being clamped to a clamp groove 23 arranged at the rear segment of the plug body 2A in FIG. 3). When the C-shaped brace is clamped to the rear segment of the plug body 2A, a region where the C-shaped brace is clamped has a volume greater than that of the central aperture, and therefore the plug body 2A cannot be pulled away from the limiting ring 2B in a frontward direction. However, the present disclosure is not limited to the foregoing structural assembly, and high-frequency waves, adhesives, screws, etc., can be used for the fixing of the plug body 2A to the limiting ring 2B.

Figure 4:
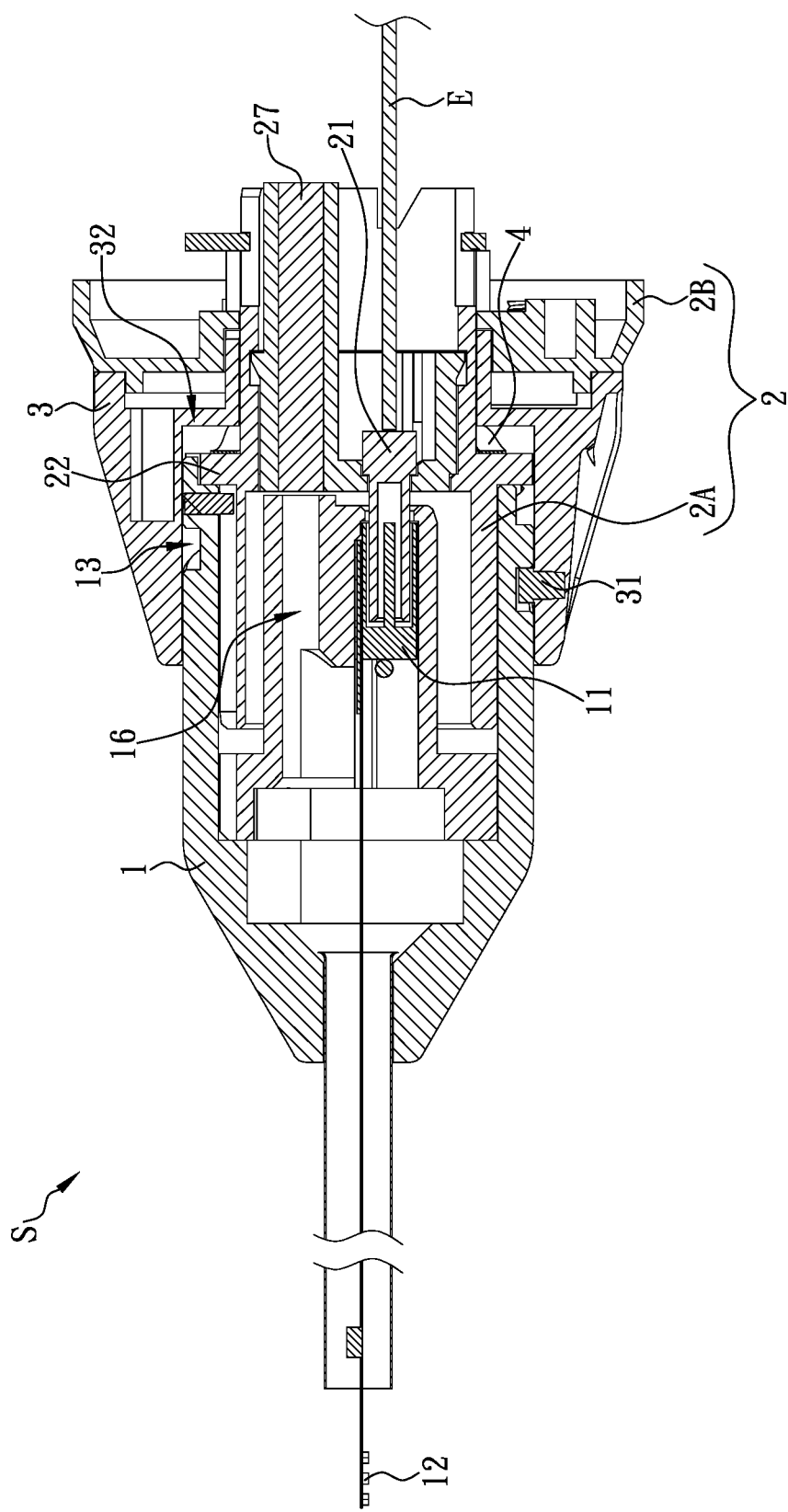
FIG. 4 is cross-sectional view of the quick connector according to the present disclosure.

Referring again to FIGS. 1 to 3, the rotatable collar 3 can be movably assembled on the plug 2, and has a through hole 30 that is formed through a center thereof. Three engaging protrusion 31 are protrudingly formed on an inner peripheral surface of a front segment of the rotatable collar 3 along the circumferential direction, and are equidistantly spaced apart from each other. A second limiting wall 32 protrudes from an inner peripheral surface of a rear segment of the rotatable collar 3. Furthermore, each of the engaging protrusions 31 can also be an individually-formed component, and can be screwed into the rotatable collar 3 from the outside and fixed by threaded engagement, until one end protrudes from the inner peripheral surface of the rotatable collar 3 to form the engaging protrusion 31. However, in other embodiments according to the present disclosure, the quantity of the engaging protrusions 31 may be adjusted to be at least one, or the spacing between each of the engaging protrusions 31 may be varied. Referring to FIG. 4, when the rotatable collar 3 is assembled to the plug 2, the second limiting wall 32 corresponds to the first limiting wall 22 and is located at a position rearward of the first limiting wall 22. Further referring to FIGS. 1 and 2, in certain embodiments, the rotatable collar 3 can be sleeved onto the plug body 2A from rear to front, and a diameter defined by the second limiting wall 32 is larger than a diameter of the through hole 30. In addition, the rotatable collar 3 can be allowed to rotate on the plug body 2A after being assembled to the limiting ring 2B, and the second limiting wall 32 is located at a position along the distance H that is between the first limiting wall 22 and the limiting ring 2B.

Figure 5:
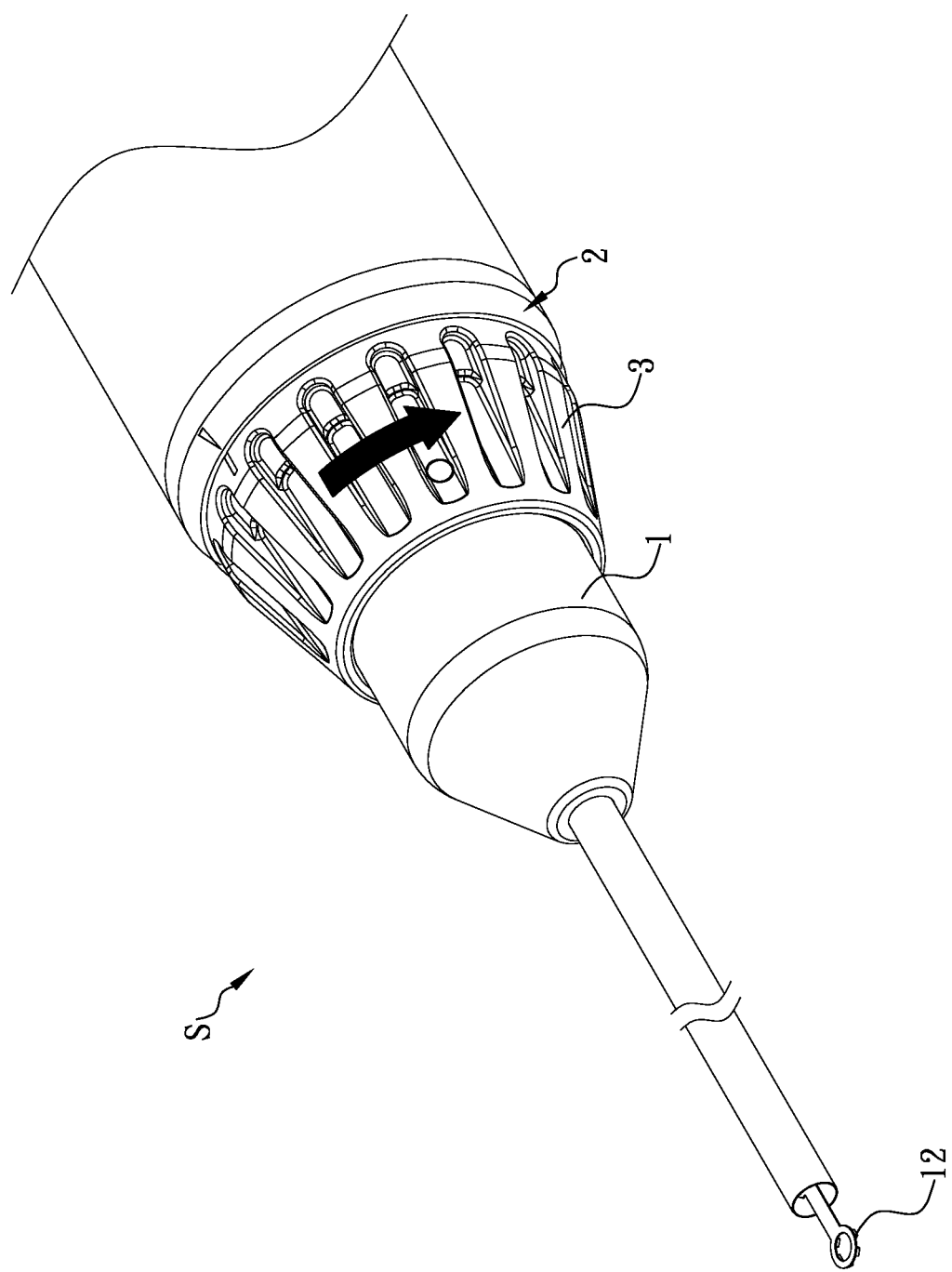
FIG. 5 is a fragmentary schematic view illustrating an assembly of the quick connector according to the present disclosure.
Figure 6:
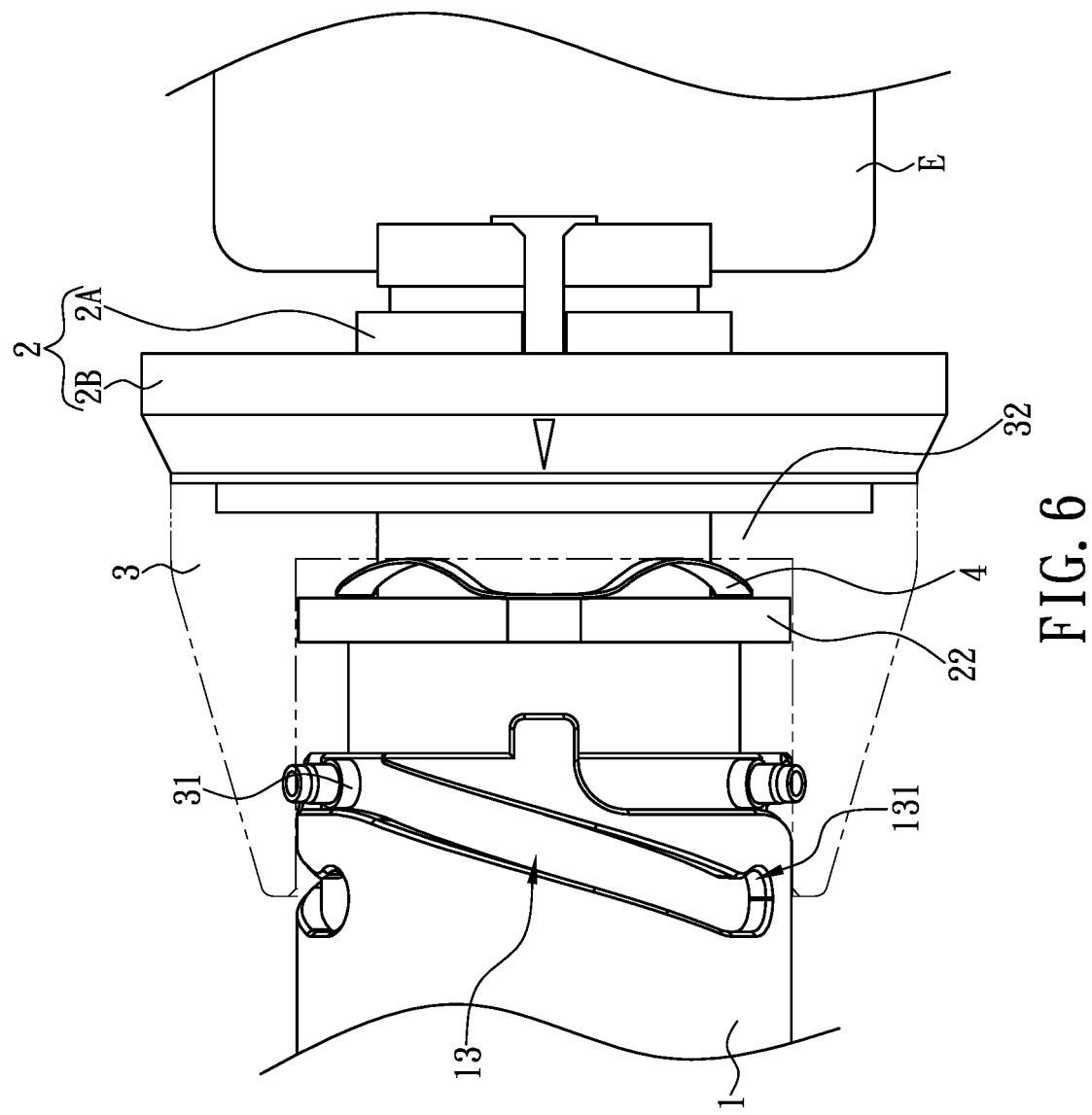
FIG. 6 is a fragmentary schematic view illustrating an engaging protrusion of the quick connector being located at an entry end of a plug-connection trackway of the quick connector according to the present disclosure.
Figure 7:
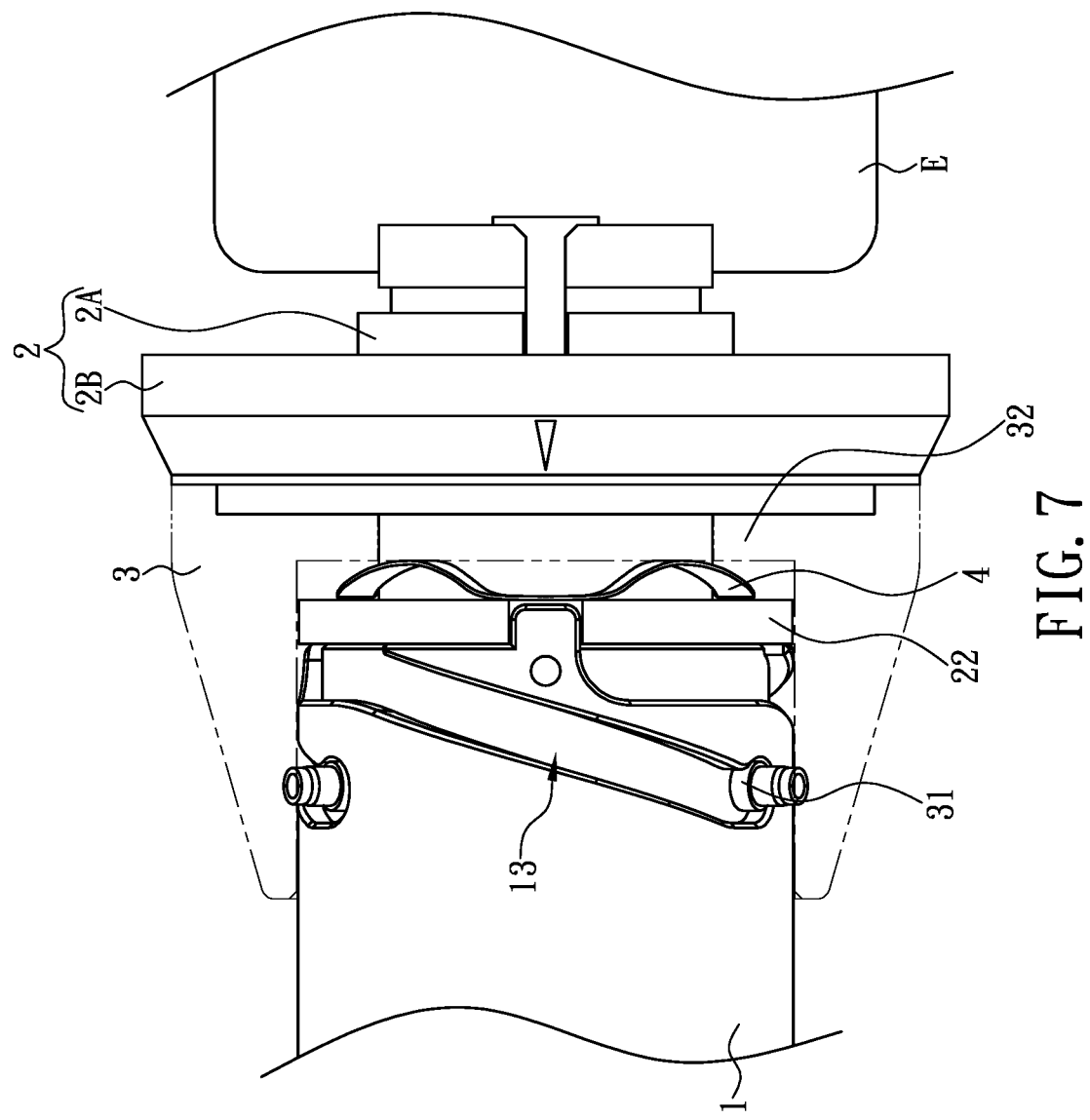
FIG. 7 is a fragmentary schematic view illustrating the engaging protrusion being located at a terminal end of the plug-connection trackway according to the present disclosure.

Further referring to FIGS. 1 to 4, the undulant resilient piece 4 is ring-shaped and has a plurality of undulations thereon. The undulant resilient piece 4 can be located between the first limiting wall 22 and the second limiting wall 32, and abuts against each of the first and second limiting walls 22, 32. When the first limiting wall 22 and the second limiting wall 32 approach each other to compress the undulant resilient piece 4, the undulant resilient piece 4 applies a force against each of the first limiting wall 22 and the second limiting wall 32 to urge the two away from each other. Referring to FIG. 5, when a user plugs the socket 1 with the plug 2, the rear segment of the socket 1 will enter into the through hole 30 of the rotatable collar 3, and the front segment of the plug 2 will enter into the socket space 10 of the socket 1, such that the first connector body 1l and the second connector body 21 can be initially combined to form a first combined state where the front segments of the first and second connector bodies 11, 21 are engaged with each other. At this time, the engaging protrusion 31 will enter into an entry end of the corresponding plug-connection trackway 13 (as shown in FIG. 6), and the user can then rotate the rotatable collar 3 (e.g., in the direction indicated by the arrow in FIG. 5) so that the engaging protrusion 31 rotates together with the rotatable collar 3 to move along the plug-connection trackway 13. Since the first connector body 11 and the second connector body 21 have been initially combined, the socket 1 will be limited to being only capable of moving rearward and frontward along its axis direction. Furthermore, when the engaging protrusion 31 moves to the terminal end of the plug-connection trackway 13 (to be in a configuration such as that shown in FIG. 7), the entire socket 1 is forced to move in a direction toward the plug 2 (i.e., in a rearward direction), such that the first connector body 11 and the second connector body 21 are more tightly combined with each other, thus forming a second combined state. The second combined state refers to a state where the first connector body 11 and the second connector body 21 are engaged to each other with a degree of tightness that is larger than that of the first combined state (i.e., the two are engaged deeper into each other), so as to establish electrical connection therebetween.

Figure 8:
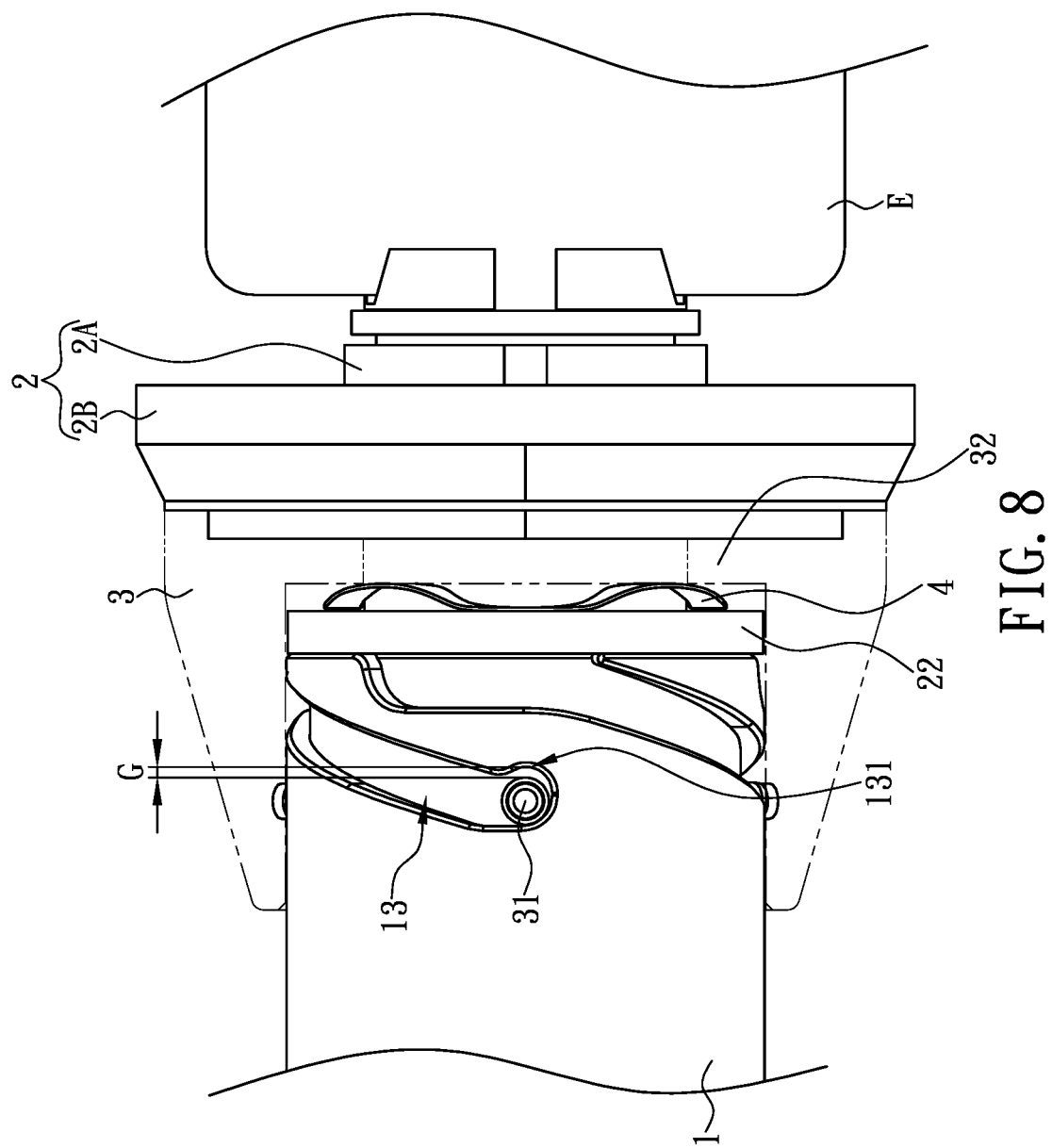
FIG. 8 is a fragmentary schematic view illustrating the engaging protrusion having entered into the plug-connection trackway but not being lodged in an engaging notch of the quick connector according to the present disclosure.
Figure 9:
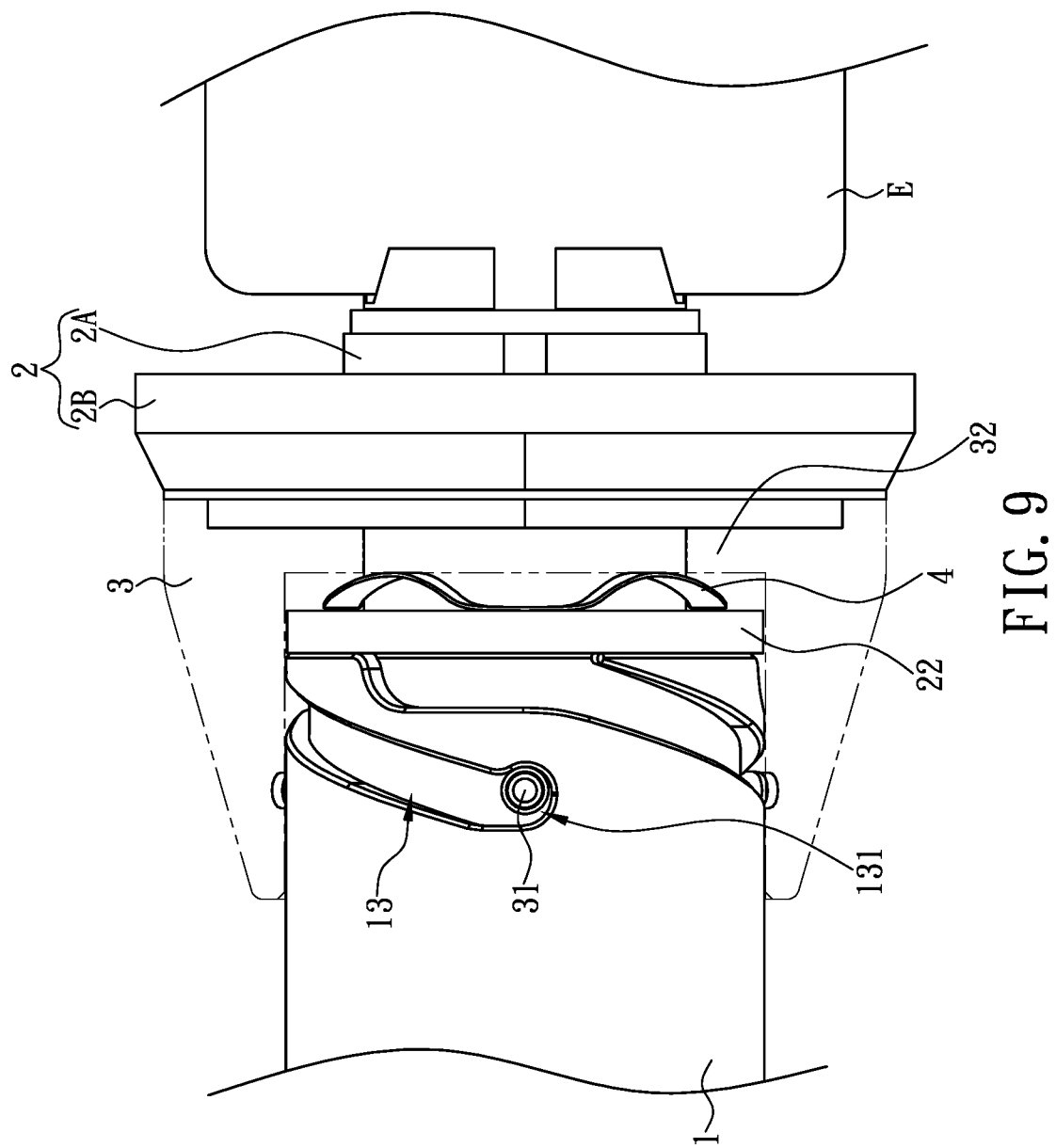
FIG. 9 is a fragmentary schematic view illustrating the engaging protrusion being lodged in the engaging notch according to the present disclosure.

In continuance of the above, after the engaging protrusion 31 moves to the terminal end of the plug-connection trackway 13, the engaging protrusion 31 and the engaging notch 131 will have a gap G therebetween, as illustrated in FIG. 8, and at this time, the undulant resilient piece 4 is compressed by the first limiting wall 22 and the second limiting wall 32 and therefore deformed by such compression. Furthermore, when the user stops applying force to the rotatable collar 3, the force acting from the undulant resilient piece 4 will urge the first limiting wall 22 and the second limiting wall 32 to move away from each other, and the engaging protrusion 31 will be lodged in position at the engaging notch 131 (to be in a configuration such as that shown in FIG. 9) with an inner sidewall of the engaging notch 131 compressing against an outer peripheral surface of the corresponding engaging protrusion 31 to form a locked state. It should be particularly noted that in practical implementations, the user would usually grip a portion of the plug 2 and turn the rotatable collar 3, so that the first limiting wall 22 is pushed away by the force acting from the undulant resilient piece 4 and causing the inner sidewall of the engaging notch 131 to be tightly abutted against the outer peripheral surface of the engaging protrusion 31. The foregoing state of pushing and abutting reflects what is referred to in the present disclosure as "compressive," but it should be noted that such description is used only to clarify interactive relationships between each of the components, and the present disclosure is not limited thereto.

By the structural configuration of the quick connector S according to the present disclosure, the engaging protrusion 31 can be firmly fixed in the engaging notch 131 so that the rotatable collar 3 can remain in this state and cannot freely rotate without being exerted with a force thereupon, which allows the socket 1 and the plug 2 to be tightly engaged. In particular, in certain embodiments, three of the engaging protrusions 31 that are equidistantly spaced apart from each other are provided, so that an insertion stability can be more consistent, and stress can be more evenly distributed. Furthermore, when the socket 1 and the plug 2 are to be separated from each other, the user simply needs rotate the rotatable collar 3 in a reverse direction (i.e., a direction opposite to that indicated by the arrow in FIG. 5) so that the engaging protrusion 31 departs from the engaging notch 131 and moves along the plug-connection trackway 13 to the entry end thereof, thereby forming an unlocked state. In this state, the entire socket 1 will move in a direction away from the plug 2, such that the first connector body 11 and the second connector body 12 are initially detached from each other. Then, the user can easily separate the socket 1 from the plug 2, thus greatly enhancing the usage convenience.

Further referring to FIGS. 2 and 3, in certain embodiments, a returning element 25 (e.g., a resilient bolt) is further assembled at a front side of the limiting ring 2B, and a return groove 35 is formed at a rear side of the second limiting wall 32 of the rotatable collar 3. When the engaging protrusion 31 is rotated to the entry end of the plug-connection trackway 13, the returning element 25 will lodge into the return groove 35 to allow the user to feel the rotatable collar 3 snapping into place. This not only allows the user to be made aware that the rotatable collar 3 has been rotated to the unlocked state, but also allows the rotatable collar 3 to maintain its current position, so as to facilitate the next plug-connection operation of the quick connector S. Additionally, in a practical implementation of the quick connector S, since the image-capturing unit 12 will most likely enter into the mouth or body of a patient or subject, in certain embodiments, an opening 26 can further be formed in the plug 2 (e.g., in the plug body 2A thereof), and a light-guiding pillar 27 can be assembled into the opening 26. Furthermore, a fiber optic guide hole 16 corresponding to the light-guiding pillar 27 can be formed in the socket 1, such that, by virtue of the foregoing structural configuration, light can be guided to a region where the image-capturing unit 12 is located to provide a requisite brightness for capturing images.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A quick connector with a compressive and rotational locking and unlocking mechanism, applicable to a medical device and comprising:
   a cylindrical socket having a first connector body disposed therein, wherein at least one plug-connection trackway is formed on a peripheral surface of a rear segment of the cylindrical socket along a circumferential direction, extends obliquely in a direction toward a front segment of the cylindrical socket, and has an engaging notch at a terminal end of the plug-connection trackway and extending in a direction toward the rear segment of the cylindrical socket;
   a cylindrical plug comprising a limiting ring, and having a second connector body disposed therein and a first limiting wall protruding from an outer peripheral surface of the cylindrical plug;
   a rotatable collar for being movably assembled on the cylindrical plug, having:
      a through hole formed at a center of the rotatable collar;
      at least one engaging protrusion protrudingly arranged on an inner peripheral surface of a front segment of the rotatable collar along the circumferential direction; and
      a second limiting wall having a diameter smaller than a diameter of the limiting ring and protruding from an inner peripheral surface of a rear segment of the rotatable collar, wherein when the rotatable collar is assembled to the cylindrical plug, the second limiting wall corresponds to the first limiting wall, and is located at a position rearward of the first limiting wall; and
   an undulant resilient piece capable of being located between the first limiting wall and the second limiting wall, and abutting against each of the first limiting wall and the second limiting wall,
   wherein when the rear segment of the cylindrical socket enters into the through hole, front segments of the first connector body and the second connector body engage with each other so that the first connector body and the second connector body form a first combined state, and the at least one engaging protrusion enters into the corresponding plug-connection trackway and, with the rotation of the rotatable collar, moves along the plug-connection trackway until reaching the terminal end of the plug-connection trackway to force the cylindrical socket to move in a direction toward the cylindrical plug without the second limiting wall moving toward the limiting ring in the moving direction of the cylindrical socket, so as to form a second combined state of the first connector body and the second connector body, the second combined state being the front segments of the first connector body and the second connector body being engaged with each other with a degree of tightness larger than that of the first combined state to establish an electrical connection therebetween and the second limiting wall being located between the first limiting wall and the limiting ring without contacting the limiting ring; and
   wherein when the rotatable collar is no longer driven to rotate, a force acting from the undulant resilient piece urges the first limiting wall to move along a direction away from the second limiting wall without the second limiting wall moving toward the limiting ring in the moving direction of the first limiting wall, so that the at least one engaging protrusion is lodged in position in the engaging notch, and an inner sidewall of the engaging notch compresses against an outer peripheral surface of the at least one engaging protrusion to form a locked state.

2. The quick connector according to claim 1, wherein the cylindrical socket is formed with three plug-connection trackways equidistantly spaced apart from each other, and the rotatable collar has three engaging protrusions equidistantly spaced apart from each other.

3. The quick connector according to claim 2, wherein an image-capturing unit is disposed at the front segment of the cylindrical socket and is electrically connected to the first connector body.

4. The quick connector according to claim 3, wherein a circuit board is disposed at a rear segment of the cylindrical plug and is electrically connected to the second connector body.

5. The quick connector according to claim 4, wherein the cylindrical plug further includes a plug body, the plug body being in the shape of a hollow cylinder, the first limiting wall being formed on an outer peripheral surface of the plug body, the second connector body being disposed within the plug body, and a rear segment of the plug body being adapted to be fixed to the limiting ring to allow the rotatable collar to rotate on the plug body and the second limiting wall to be located between the first limiting wall and the limiting ring.

6. The quick connector according to claim 5, further including a returning element configured to be assembled to a front side of the limiting ring, and, when the rotatable collar is rotated to an entry end of the plug-connection trackway, lodge into a return groove formed on the second limiting wall and located at a rear side of the second limiting wall.

7. The quick connector according to claim 6, wherein the cylindrical plug is formed with an opening to which a light-guiding pillar is configured to be assembled.

8. The quick connector according to claim 7, wherein the cylindrical socket is formed with a fiber optic guide hole corresponding to the light-guiding pillar.

9. The quick connector according to claim 1, wherein the cylindrical plug further includes a plug body, the plug body being in the shape of a hollow cylinder, the first limiting wall being formed on an outer peripheral surface of the plug body, the second connector body being disposed within the plug body, and a rear segment of the plug body being adapted to be fixed to the limiting ring to allow the rotatable collar to rotate on the plug body and the second limiting wall to be located between the first limiting wall and the limiting ring.

10. The quick connector according to claim 9, further including a returning element configured to be assembled to a front side of the limiting ring, and, when the rotatable collar is rotated to an entry end of the plug-connection trackway, lodge into a return groove formed on the second limiting wall and located at a rear side of the second limiting wall.

11. The quick connector according to claim 10, wherein the cylindrical plug is formed with an opening to which a light-guiding pillar is configured to be assembled.

12. The quick connector according to claim 11, wherein the cylindrical socket is formed with a fiber optic guide hole corresponding to the light-guiding pillar.

13. The quick connector according to claim 2, wherein the cylindrical plug further includes a plug body, the plug body being in the shape of a hollow cylinder, the first limiting wall being formed on an outer peripheral surface of the plug body, the second connector body being disposed within the plug body, and a rear segment of the plug body being adapted to be fixed to the limiting ring to allow the rotatable collar to rotate on the plug body and the second limiting wall to be located between the first limiting wall and the limiting ring.

14. The quick connector according to claim 13, further including a returning element configured to be assembled to a front side of the limiting ring, and, when the rotatable collar is rotated to an entry end of the plug-connection trackway, lodge into a return groove formed on the second limiting wall and located at a rear side of the second limiting wall.

15. The quick connector according to claim 14, wherein the cylindrical plug is formed with an opening to which a light-guiding pillar is configured to be assembled.

16. The quick connector according to claim 15, wherein the cylindrical socket is formed with a fiber optic guide hole corresponding to the light-guiding pillar.

17. The quick connector according to claim 3, wherein the cylindrical plug further includes a plug body, the plug body being in the shape of a hollow cylinder, the first limiting wall being formed on an outer peripheral surface of the plug body, the second connector body being disposed within the plug body, and a rear segment of the plug body being adapted to be fixed to the limiting ring to allow the rotatable collar to rotate on the plug body and the second limiting wall to be located between the first limiting wall and the limiting ring.

18. The quick connector according to claim 17, further including a returning element configured to be assembled to a front side of the limiting ring, and, when the rotatable collar is rotated to an entry end of the plug-connection trackway, lodge into a return groove formed on the second limiting wall and located at a rear side of the second limiting wall.

19. The quick connector according to claim 18, wherein the cylindrical plug is formed with an opening to which a light-guiding pillar is configured to be assembled.

20. The quick connector according to claim 19, wherein the cylindrical socket is formed with a fiber optic guide hole corresponding to the light-guiding pillar.

* * * * *